United States Patent
Koyama et al.

[11] Patent Number: 5,916,061
[45] Date of Patent: Jun. 29, 1999

[54] CONTROL APPARATUS FOR CLUTCH OF VEHICLE

[75] Inventors: Hideo Koyama; Daihei Teshima, both of Saitama-ken, Japan

[73] Assignee: Honda Giken Kogyo Kabushiki Kaisha, Tokyo, Japan

[21] Appl. No.: 08/938,598

[22] Filed: Sep. 25, 1997

[30] Foreign Application Priority Data

Sep. 27, 1996 [JP] Japan ................................. 8-256775

[51] Int. Cl.$^6$ ........................... B60K 41/02; B60K 41/20
[52] U.S. Cl. .................................... 477/175; 477/171
[58] Field of Search .................... 417/71, 74, 86, 417/171, 175, 180; 192/13 R, 103 R, 103 F

[56] References Cited

U.S. PATENT DOCUMENTS

| | | | |
|---|---|---|---|
| 4,363,389 | 12/1982 | Zaunberger et al. | 477/74 |
| 4,653,621 | 3/1987 | Oshiage | 477/175 |
| 4,760,902 | 8/1988 | Bellanger | 477/171 X |
| 5,024,305 | 6/1991 | Kurihara et al. | 477/175 |
| 5,074,392 | 12/1991 | Hasegawa et al. | 477/175 |

FOREIGN PATENT DOCUMENTS 62-216842  9/1987  Japan.
1-244930  9/1989  Japan.

*Primary Examiner*—Charles A Marmor
*Assistant Examiner*—Sherry Lynn Estremsky
*Attorney, Agent, or Firm*—Armstrong, Westerman, Hattori, McLeland and Naughton

[57] ABSTRACT

In a control apparatus in which a weak creep control for lowering the engaging force of a clutch (5) is performed when a throttle opening (θth) is fully closed, when a brake pedal (BP) is depressed, and when the period of a vehicle speed judging pulse (V pulse) has exceeded a predetermined value TM2s whereby the vehicle is discriminated to be in a stopped condition. Once the weak creep control has started, the weak creep control is stopped by the input of the first V pulse and is transferred to a strong creep control in which the clutch engaging force is increased.

1 Claim, 3 Drawing Sheets

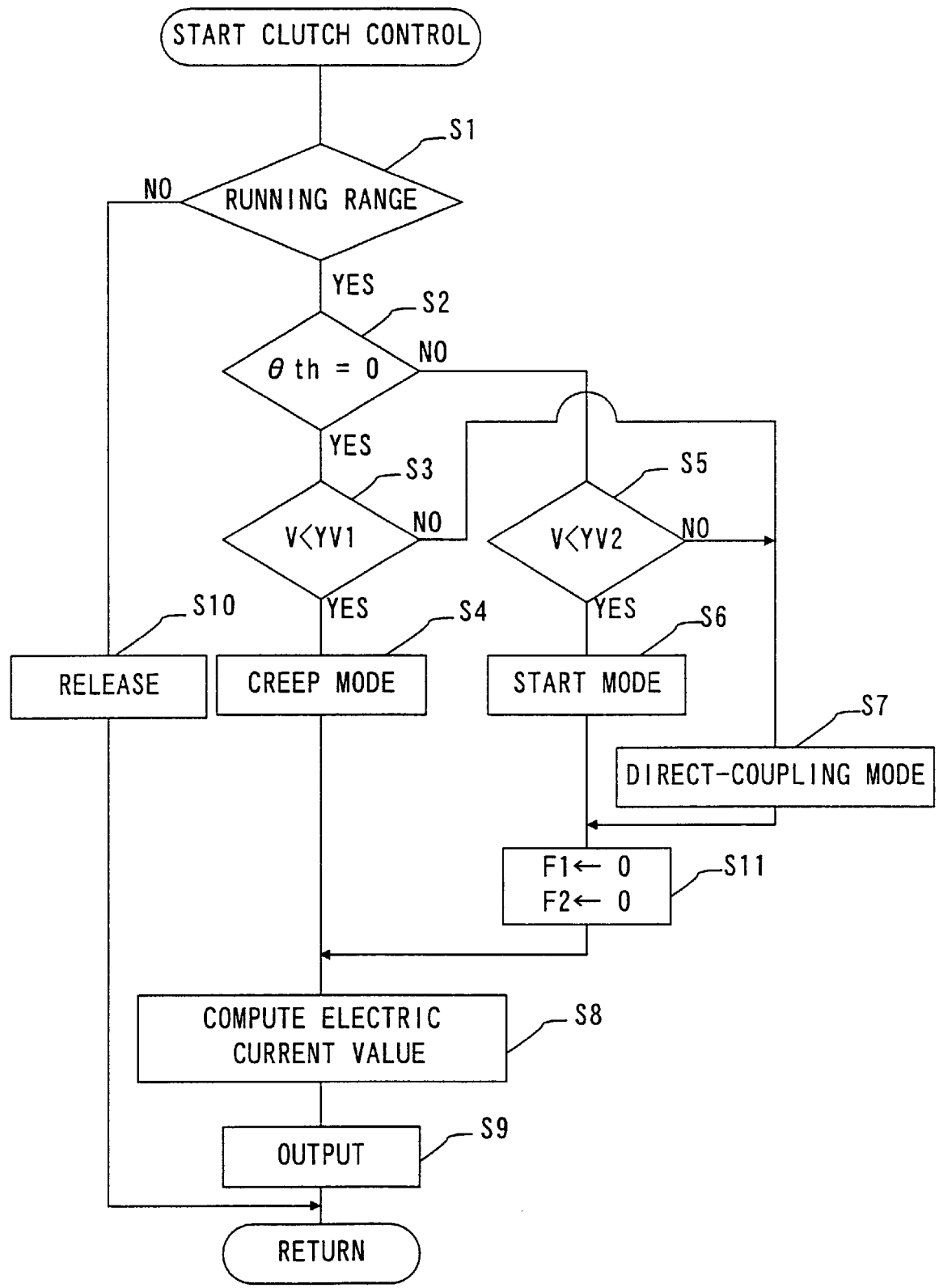

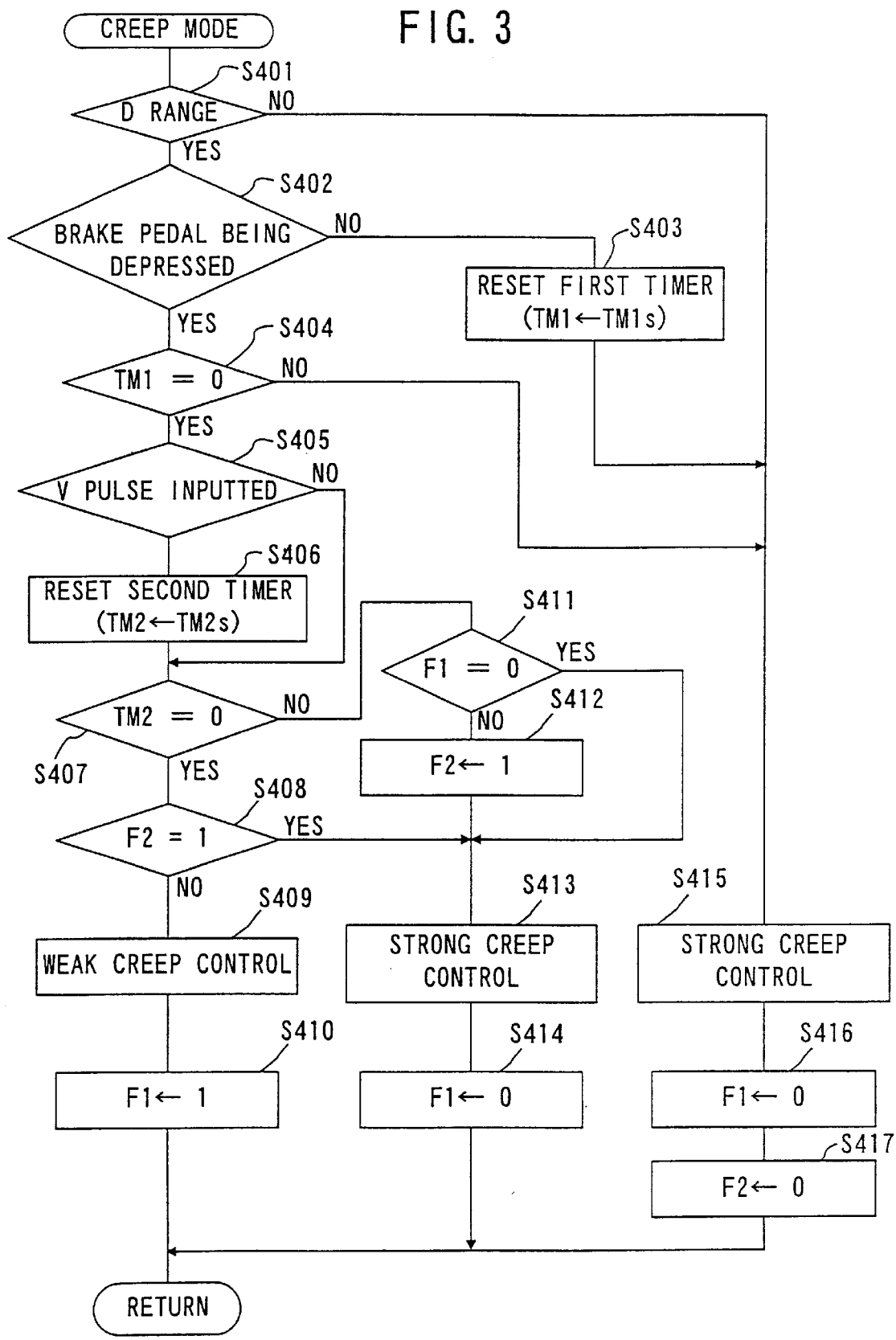

CONTROL APPARATUS FOR CLUTCH OF VEHICLE

BACKGROUND OF THE INVENTION

1. Field of the Invention

The present invention relates to a control apparatus for a clutch of a vehicle such as a motor vehicle. The control apparatus controls the engaging force of the clutch which is interposed in a power transmission device for transmitting a driving force of an engine to driving wheels of the vehicle.

2. Description of the Related Art

As this kind of control apparatus, there is conventionally known the following one. Namely, even in a specific driving condition in which a throttle opening of an engine is zero and in which the speed of a vehicle is below a predetermined value, a clutch is engaged so that a so-called creep running can be performed.

The creep running enables the vehicle to run at an extremely low speed very easily. Therefore, the creep running is very convenient in moving the vehicle towards a shoulder of a road or in putting the vehicle into a garage. On the other hand, if a creep torque to be transmitted to driving wheels when a brake is being applied is large, the creep torque will become a cause for the vibrations of a vehicle body and a poor specific fuel consumption. Therefore, it is desired to minimize the creep torque at the time of applying the brake.

As a control apparatus to attain this desire, the following is known in Japanese Published Unexamined Patent Application Nos. 216842/1987 and 244930/1989. Namely, at the time of depressing a brake pedal in a condition in which the throttle opening is zero and also in which the vehicle is stopped, the engaging force of the clutch is made lower than at the time when the brake pedal is not being depressed. In the above-described arrangement, the vehicle speed is detected based on a vehicle speed judgement pulse which is generated at a period according to the rotational speed on the output side of the power transmission device. And a judgement is made that the vehicle is in a stopped condition when the period of the vehicle speed judgement pulse has exceeded a predetermined value.

In the above-described conventional control apparatus, when the brake pedal is released from depression, the engaging force of the clutch increases, whereby the creep torque restores back to the original magnitude. However, the engaging force of the clutch does not increase instantly and, consequently, there occurs a time lag for the creep torque to restore to its original magnitude.

Therefore, in order to improve the operability (or ease of operation) at the time of starting of the vehicle, it is desired to make the following arrangement. Namely, even if the depression of the brake pedal is not completely released, the control to lower or decrease the engaging force of the clutch is stopped at the time when the vehicle has started to move as a result of weakening of the force of depressing the brake pedal. In this manner, a sufficient creep torque is obtained from the very beginning at the time of releasing the depression of the brake pedal.

In case the detection of the vehicle speed is made by the period of the vehicle speed judgement pulse as described above, when the vehicle speed judgement pulse ceases to be generated as a result of stopping of the vehicle, the period remains to be indefinite until a second pulse is generated, even if the vehicle speed judgement pulse is generated when the vehicle subsequently has started to move. The vehicle is therefore discriminated to be in a stopped condition. As a consequence, the lowering or decrease in the engaging force of the clutch cannot immediately be stopped at the time when the vehicle has started to move, thereby resulting in a delay in the restoration of the creep torque.

In view of the above point, the present invention has an object of providing a control apparatus in which the lowering or decrease in the engaging force of the clutch is stopped with a good response at the time when the vehicle has started to move so that a sufficient creep torque can be obtained from the very beginning at the time of releasing the depression of the brake pedal.

SUMMARY OF THE INVENTION

In order to attain the above and other objects, the present invention is a control apparatus for a clutch of a vehicle, the clutch being interposed in a power transmission device which transmits a driving force of an engine to driving wheels of the vehicle. The control apparatus controls an engaging force of the clutch and comprises: brake detecting means for detecting a depression of a brake pedal; throttle opening detecting means for detecting a throttle opening of the engine; stop judging means for judging a stopped condition of the vehicle based on a vehicle speed judging pulse; and engaging force lowering means for lowering the engaging force of the clutch when the depression of the brake pedal is detected in a condition in which the detected throttle opening is zero and also in which the vehicle is discriminated to be in a stopped condition; characterized in that the control apparatus further comprises engaging force restoring means which stops the lowering of the engaging force of the clutch by the engaging force lowering means, the lowering being stopped upon input of a first vehicle speed judging pulse after start of lowering of the engaging force.

According to the present invention, when the vehicle has started to move, say, by lowering or decrease in the force of depressing the brake pedal, or the like, after the clutch engaging force has lowered, the lowering in the clutch engaging force is immediately stopped right after the input of the first vehicle speed judging pulse. Therefore, it becomes possible to obtain a sufficient creep torque from the beginning at the time when the depressing of the brake pedal is released. The operability at the time of starting of the vehicle on an upward slope or the like is thus improved.

In the embodiment to be described hereinafter, what corresponds to the above-described clutch is a starting clutch 5. What corresponds to the brake detecting means is a brake detector 19. What corresponds to the stop judging means is the processing in steps S405, S406 and S407 in FIG. 3. What corresponds to the engaging force lowering means is the processing in steps S402 through S409. What corresponds to the engaging force restoring means is the processing in steps S405 through S413. Further, in the embodiment to be described hereinafter, the throttle opening signal θth is outputted from an engine control unit ECU, and what corresponds to the throttle opening detecting means is the engine control unit ECU.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 2 is a flow chart showing an outline of the control of the clutch; and

FIG. 3 is a flow chart showing the control of the clutch in a creep mode.

DETAILED DESCRIPTION OF A PREFERRED EMBODIMENT

Figure 1:
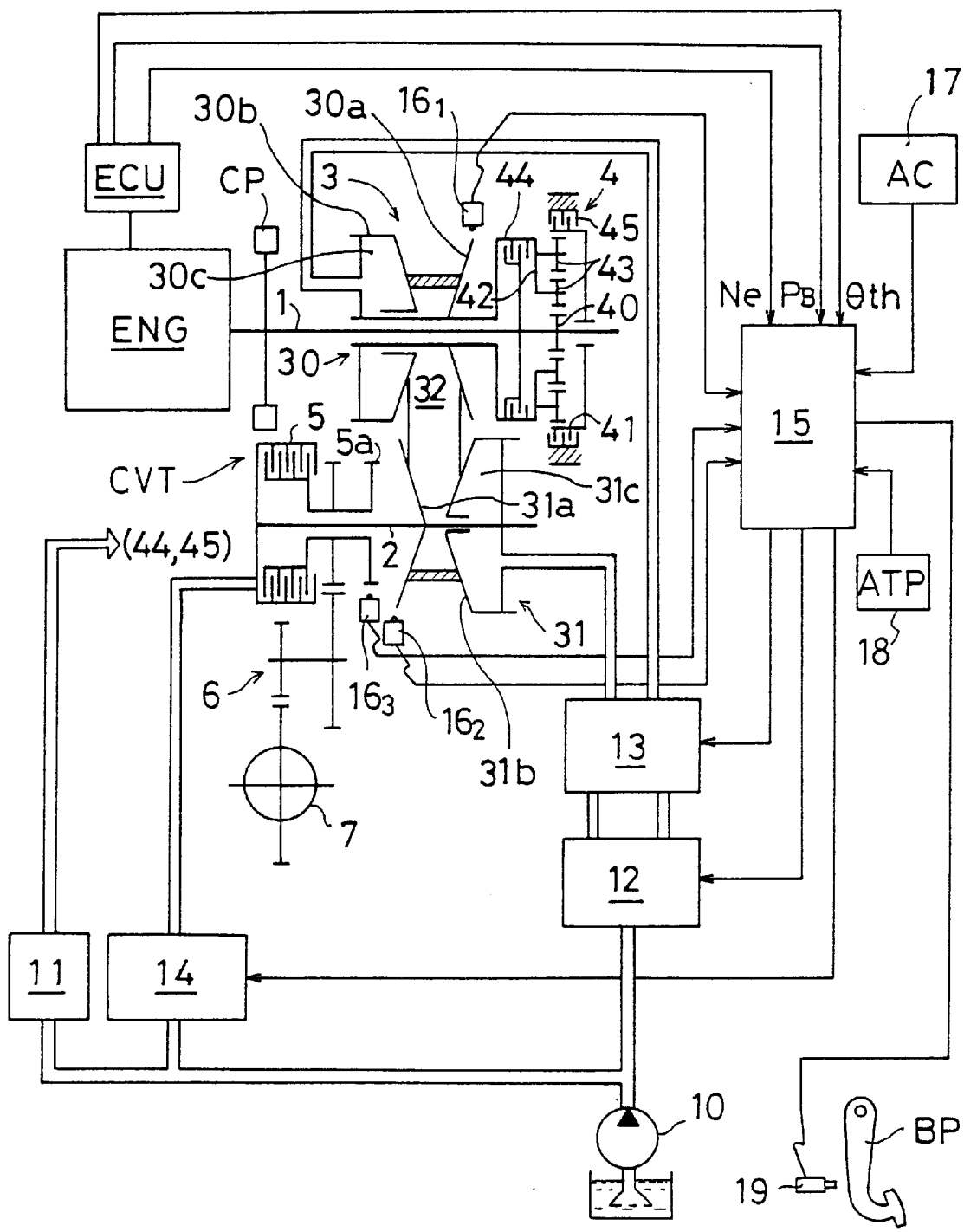
FIG. 1 is a schematic diagram showing one example of a power transmission device and its control system, the device being provided with a clutch to be controlled by the control apparatus of the present invention.

FIG. 1 shows a belt-type continuously (or infinitely or steplessly) variable transmission CVT, as a power transmission device, which transmits a driving force of an engine of a vehicle such as a motor vehicle to the driving wheels thereof. The transmission comprises: a V-belt mechanism 3 which is disposed between an input shaft 1 to be connected to the engine ENG via a coupling mechanism CP and an output shaft 2; a switching mechanism 4 for switching between forward and reverse (or rearward) running which is disposed on an input side of the V-belt mechanism 3; and a start clutch 5 which is disposed on an output side of the V-belt mechanism 3.

The V-belt mechanism 3 is made up of: a drive pulley 30 which is rotatably supported on the input shaft 1; a driven pulley 31 which is connected to the output shaft 2 so as not to rotate relative to the output shaft 2; and a metallic V-belt 32 which is wound around both the pulleys 30, 31. Each of the pulleys 30, 31 is made up of: a fixed sheave 30a, 31a; a movable sheave 30b, 31b which is axially movable relative to the fixed sheave 30a, 31a; and a cylinder chamber 30c, 31c which urges or pushes the movable sheave 30b, 31b towards the fixed sheave 30a, 31a. Continuously variable transmission is performed in the following manner. Namely, by adequately controlling the pressure of oil supply to the cylinder chambers 30c, 31c of both the pulleys 30, 31 (i.e., the pulley control hydraulic pressure), a suitable pulley side-pressure which causes the V-belt 32 not to slip is generated, and also the pulley width of both the pulleys 30, 31 is varied, thereby changing the diameter of winding the V-belt 32 on the pulleys 30, 31.

The switching mechanism 4 for switching between forward and reverse running is constituted by a planetary gear mechanism which is made up of: a sun gear 40 connected to the input shaft 1; a ring gear 41; a carrier 42 which is connected to the drive pulley 30; planetary gears 43 which are rotatably supported on the carrier 42 for engagement with the sun gear 40 and the ring gear 41; a forward clutch (i.e., a clutch for forward running) 44 which can connect the input shaft 1 and the carrier 42; and a reverse brake (i.e., a brake for reverse running) 45 which can fix the ring gear 41. When the forward clutch 44 is engaged, the carrier 42 rotates together with the input shaft 1, and the drive pulley 30 is driven in the same direction as the input shaft 1 (i.e., in the forward direction). When the reverse brake 45 is engaged, the carrier 42 is rotated in a direction opposite to that of the sun gear 40, and the drive pulley 30 is driven in the direction opposite to that of the input shaft 1 (i.e., in the reverse direction). When both the forward clutch 44 and the reverse brake 45 are disengaged, the power transmission via the switching mechanism 4 for switching between forward and reverse running is cut off.

The start clutch 5 is connected to the output shaft 2. When the start clutch 5 is engaged, the output of the engine 3 whose speed has been changed by the V-belt mechanism 3 is transmitted to a differential mechanism 7 via a gear train 6 on the output side of the start clutch 5, and the driving force is thus transmitted from the differential mechanism 7 to the right and left driving wheels (not illustrated) of the vehicle. When the start clutch 5 is disengaged, the transmission of power cannot be effected, and the continuously variable transmission CVT becomes a neutral condition.

In the hydraulic control circuit for the continuously variable transmission CVT, there are provided: a hydraulic pump 10 to be driven by the engine ENG; a manual valve 11 which controls the supply and discharge of hydraulic oil to and from the forward clutch 44 and the reverse brake 45 and which is switch-operated in interlocking with a shift lever (not illustrated); a pulley side-pressure control valve 12 which generates the pulley control hydraulic pressure to be supplied to cylinder chambers 30c, 31c of the drive pulley 30 and the driven pulley 31, respectively; a speed-change control valve 13 which controls the supply of pulley control hydraulic pressure to each of the cylinder chambers 30c, 31c; and a clutch control valve 14 which controls the hydraulic fluid pressure to be supplied to the start clutch 5.

The pulley side-pressure control valve 12, the speed-change control valve 13, and the clutch control valve 14 are constituted into linear solenoid valves which are controlled by a controller 15, and are arranged to output hydraulic pressures which are proportional to the values of electric current to be charged to the solenoids thereof. To the controller 15 the following signals are inputted, namely: signals from an engine control unit ECU showing the revolution speed (rotational frequency) Ne, a negative suction pressure PB, and a throttle opening θth of the engine ENG; signals from first through third rotation sensors $16_1$, $16_2$, $16_3$ showing the revolution speed of the drive pulley 30, the revolution speed of the driven pulley 31, and the revolution speed of the output side of the start clutch 5, respectively; a signal from an air conditioner operation detector 17 which detects the operation of an air conditioner AC; a signal from a shift range detector 18 which detects the shift range position ATP based on the position of a shift lever or of the manual valve 11; and a signal from a brake detector 19 which detects the depressing operation of a brake pedal BP.

The third rotation sensor $16_3$ generates a pulse at a period which is in inverse proportion to the revolution speed on the output side of the start clutch 5, in cooperation with a pulser gear 5a on the output side of the start clutch 5. The controller 15 detects an angular velocity of the driving wheel based on the period of that pulse from the third rotation sensor $16_3$ which serves as a vehicle speed judgement pulse, and detects the vehicle speed based on the angular velocity.

An explanation will now be made about the control of the clutch control valve 14, i.e., the start clutch 5, by means of the controller 15.

The start clutch 5 is controlled, as shown in FIG. 2, in three modes of a creep mode, a start mode, and a direct-coupling mode in a running range of an automatic speed change range and a low-speed holding range for forward running, or a reverse running range. In the running range, if the throttle opening θth is zero and also if the vehicle speed V is below a first predetermined vehicle speed YV1 which is set to an extremely low speed (e.g., 10 km/h), the program (or processing) proceeds from step S1 through steps S2, S3 to step S4 to thereby select the creep mode. If the throttle opening θth is not zero and also if the vehicle speed V is below a second predetermined vehicle speed YV2 which is set to a relatively low speed (e.g., 30 km/h), the program proceeds from step S1 through steps S2, S5 to step S6 to thereby select the start mode. In the conditions other than the above, the program proceeds to step S7 to thereby select the direct-coupling mode.

Then, depending on the selected mode, a target hydraulic engaging pressure of the start coupling 5 is determined. And an electric current value which generates the target hydraulic engaging pressure is computed (step S8), and then this electric current value is outputted to the solenoid of the clutch control valve 14 (step S9). In the start mode, as shown in Japanese Published Examined Patent Application No. 26943/1994, the target hydraulic engaging pressure is set based on a slipping degree of the start clutch 5 (to be obtained by detected values of the second and third rotation sensors $16_2$, $16_3$), and the revolution speed Ne of the engine so that a smooth starting of the vehicle can be obtained. Further, in the direct-coupling mode, the target hydraulic engaging pressure is set based on the engine torque which is estimated from the revolution speed Ne of the engine and the negative suction pressure PB, as well as on the slipping degree of the start clutch 5. When the shift range is not in the running range, namely, when the shift range is in a neutral range or in a parking range, the start clutch 5 is released (step S10).

With reference to FIG. 3, when the creep mode is selected, a discrimination is made first in step S401, based on a signal from the shift range detector 18, as to whether or not the shift range is in the D range which is the automatic speed change range for forward running. If the shift range is in the D range, the program proceeds to step S402, in which a discrimination is made, based on a signal from the brake detector 19, as to whether the brake pedal BP is being depressed or not. If the brake pedal BP is not being depressed, the program proceeds to step S403, in which the remaining time TM1 of a first subtractive timer (subtraction type of timer), which is built in the controller 15, is reset to a predetermined set time TM1s.

If the brake pedal BP is being depressed, the program proceeds to step S404, in which a discrimination is made whether the remaining time TM1 of the first timer is zero or not. It is when the time (or duration) of depressing the brake pedal BP has reached the set time TM1s that the condition of TM1=0 is satisfied. In this case, the program proceeds to step S405, in which a discrimination is made whether there is an input of the pulse from the third rotation sensor $16_3$, i.e., the vehicle speed judgement pulse (hereinafter called a V pulse). If the V pulse is inputted, the program proceeds to step S406, in which the remaining time TM2 of a second subtractive timer, which is built in the controller 15, is reset to a predetermined set time TM2s. If the V pulse is not inputted, the program proceeds to step S407 without resetting the second timer. In step S407, a discrimination is made whether the remaining time TM2 of the second timer is zero or not. It is when the vehicle is stopped and the next V pulse is not inputted even at a lapse of the set time TM2s after the input of the last V pulse, that the condition of TM2=0 is satisfied. The controller 15 then discriminates that the vehicle is in a stopped condition.

When TM2=0, the program proceeds to step S408, in which a discrimination is made whether a second flag F2 is 1 or not. If F2=0, a weak creep control is performed in step S409, and then a first flag F1 is set to 1 in step S410. In the weak creep control, there is determined, as a target hydraulic engaging pressure, a predetermined or learned hydraulic pressure value which is of such a degree that an ineffective stroke (a play until a friction plate comes to be engaged) of the piston of the start clutch 5 is removed to thereby generate a slight engaging force. The engaging force of the start clutch 5 thus lowers or decreases.

If TM2≠0, the program proceeds from step S407 to step S411, in which a discrimination is made as to whether the first flag F1 is zero or not. If F1=1, the second flag F2 is set to 1 in step S412 and the program then proceeds to step S413. If F1=0, step S412 is bypassed and the program proceeds to step S413. Also when a discrimination of F2=1 is made in step S408, the program proceeds to step S413. Then, after performing a strong creep control in step S413, the program proceeds to step S414 and the first flag F1 is reset to zero. In the strong creep control, like at the time when the start mode is selected, the target hydraulic engaging pressure is determined based on the slipping degree of the start clutch 5 and the revolution speed Ne of the engine. The torque that can be transmitted when the start clutch 5 is engaged at this target hydraulic engaging pressure is considerably larger than the torque that can be transmitted when the start clutch 5 is engaged at the target hydraulic engaging pressure to be determined by the weak creep control. Therefore, even if the engine ENG is in an idling condition, the creep torque that is sufficient to run the vehicle in creeping condition can be transmitted to the driving wheels.

In such cases when the shift range is in the running range other than D range, when the brake pedal BP is not being depressed or when TM1≠0 even if the brake pedal BP is being depressed, the program proceeds to step S415, in which the strong creep control similar to that to be performed in step S413 is performed. Also in steps S416 and S417, the first flag F1 and the second flag F2 are set to zero, respectively. Further, also when a transfer has been made from the creep mode to another mode, the first flag F1 and the second flag F2 are respectively reset to zero in step S11 in FIG. 2.

According to the above-described arrangement, when the throttle opening θth is zero and also when the brake pedal BP has been continuously depressed for more than the set time TM1s, the weak creep control is performed when the condition of TM2=0 is satisfied, i.e., when the vehicle has attained a stopped condition. When the vehicle thereafter has started to move as a result of weakening the depressing force of the brake pedal BP, or the like, whereby the first V pulse is inputted, the second timer is reset in step S406 and a discrimination of TM2≠0 is made in step S407. The program thus proceeds to step S411. Here, since the first flag F1 has already been set to 1 in step S410 last time, the program proceeds to step S413 after setting the second flag F2 to 1 in step S412 to thereby start the strong creep control. Then, if the second V pulse is not inputted even after the lapse of the set time TM2s whereby the condition of TM2=0 is satisfied, the program proceeds from step S408 to step S413 since the second flag F2 has been set to 1. The strong creep control is thus continued. In this manner, when the vehicle begins to move after the weak creep control has started, the weak creep control is stopped by the input of the first V pulse to thereby transfer to the strong creep control. Therefore, it becomes possible to deal with, or countermeasure, the oppositely operating(or backwardly working) torque due to the gravity on an upward slope. Further, even if there occurs a delay in the rise in the hydraulic pressure at the beginning of starting of the strong creep control, the hydraulic pressure will have risen or increased at the time when the depression of the brake pedal is completely released. Consequently, a sufficient creep torque can be obtained and the operability at the time of starting of the vehicle is thus improved.

When the period of the V pulse becomes shorter than the set time TM2s with the movement of the vehicle after the starting of the strong creep control in step S413, the program proceeds from step S407 to step S411. Here, since the first flag F1 is reset to zero in step S414 during the strong creep control, the program proceeds to step S413 by bypassing step S412, to thereby continue the strong creep control. Then, when the vehicle speed has exceeded the first predetermined vehicle speed YV1, the second flag F2 is reset to zero in step S11. Thereafter, even if the condition of V<YV1 is satisfied, the step S412 is bypassed as describe above, thereby maintaining the condition of F2=0. In addition, also when the strong creep control is performed in step S415 by the releasing of depression of the brake pedal BP, or the like, the condition becomes F2=0. In this manner, since the condition of F2=0 has already been satisfied when the vehicle stops by braking after it has started, the program proceeds from step S408 to step S409 to thereby perform the weak creep control.

In case the brake pedal BP is instantly depressed lightly for the purpose of slightly lowering the vehicle speed after the vehicle it has started, a condition of TM1=0 is not satisfied. Therefore, the program proceeds from step S404 to step S415 to thereby perform the strong creep control. It follows that the creep torque will be maintained in the same magnitude as that before the brake pedal BP is depressed. Therefore, the vehicle will not come to an immediate stop against the driver's intention by the depression of the brake pedal BP. Instead, the control that coincides with the driver's intention of slightly lowering the vehicle speed can be performed. Accordingly, it can be smoothly performed to move the vehicle to a road's shoulder or to put the vehicle into a garage by a temporary depression of the brake pedal BP by utilizing the creep torque while keeping the vehicle speed down.

As is clear from the above explanations, according to the present invention, it becomes possible to obtain a sufficient creep torque from the very beginning at the time of releasing the depression of the brake pedal. Therefore, the operability at the time of starting the vehicle on an upward slope, or the like, is improved.

It is readily apparent that the above-described control apparatus for a clutch of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a clutch of a vehicle, said clutch being interposed in a power transmission device which transmits a driving force of an engine to driving wheels of the vehicle, said control apparatus being for controlling an engaging force of the clutch, comprising:

vehicle speed judging means for judging a vehicle speed based on vehicle speed judging pulses which are generated at a period which is in inverse proportion to a revolution speed on an output side of the clutch;

brake detecting means for detecting a depression of a brake pedal;

throttle opening detecting means for detecting a throttle opening of the engine;

stop judging means for judging a stopped condition of the vehicle based on said vehicle speed judging pulse;

engaging force lowering means for lowering the engaging force of the clutch when the depression of the brake pedal is detected in a condition in which the detected throttle opening is zero and also in which the vehicle is discriminated to be in the stopped condition; and engaging force restoring means for stopping the lowering of the engaging force of the clutch by said engaging force lowering means, wherein said lowering stopped upon input of a first vehicle speed judging pulse after start of lowering of the engaging force.

* * * * *

UNITED STATES PATENT AND TRADEMARK OFFICE
CERTIFICATE OF CORRECTION

PATENT NO.: 5,916,061
DATED : June 29, 1999
INVENTOR(S): KOYAMA et al.

It is certified that an error appears in the above-identified patent and that said Letters Patent is hereby corrected as shown below:

In Column 8 on line 33, in claim 1, change "said lowering stopped" to be --said lowering is stopped--.

Signed and Sealed this

Eighteenth Day of April, 2000

*Attest:*

Q. TODD DICKINSON

*Attesting Officer*     *Director of Patents and Trademarks*